2,077,377

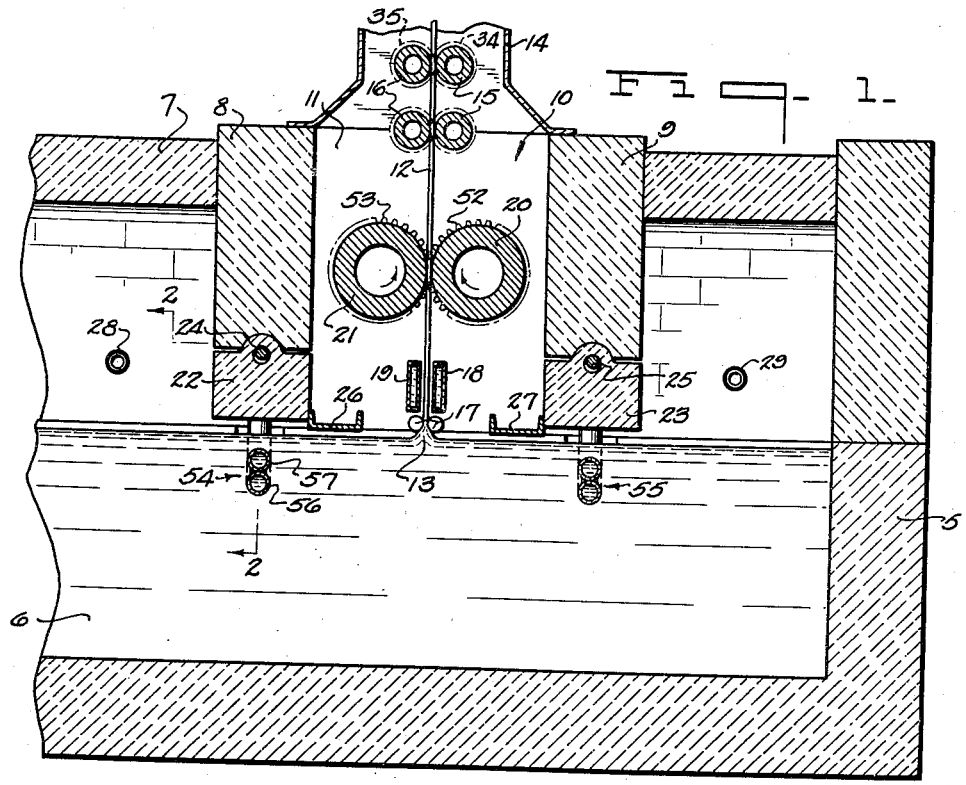
April 20, 1937. J. L. DRAKE 2,077,377
METHOD AND APPARATUS FOR PRODUCING SHEET GLASS
Filed May 24, 1934
Inventor
JOHN L. DRAKE
By Frank Fraser
Attorney Patented Apr. 20, 1937

UNITED STATES PATENT OFFICE 2,077,377

METHOD AND APPARATUS FOR PRODUCING SHEET GLASS

John L. Drake, Toledo, Ohio, assignor to Libbey-Owens-Ford Glass Company, Toledo, Ohio, a corporation of Ohio Application May 24, 1934, Serial No. 727,315

10 Claims. (Cl. 49—17)

The present invention relates to improvements in methods and apparatus for producing sheet glass.

In the manufacture of a continuous or substantially continuous sheet or ribbon of glass, the molten glass is ordinarily produced in the melting end of a relatively long tank furnace and caused to flow slowly through the refining and cooling portions thereof to the working end from which it is withdrawn in flat sheet form. While this invention is not limited to use in connection with any particular type of furnace or sheet forming machine, it is of utility when associated with the working end of a tank furnace from which a sheet is being drawn upwardly from the surface of the mass of molten glass contained therein and passed vertically through an annealing leer.

An important object of the invention is the provision of a method and apparatus affording a better and more accurate control of the temperature of the molten glass passing into the sheet being formed to the end that the sheet produced will be of an improved quality and substantially free of lines and other defects.

Another important object of the invention is the provision of a method and apparatus for rapidly conditioning the molten glass from which the sheet is formed as it enters the drawing area or zone to the end that the glass will not only be of a better quality, but the temperature thereof rendered suitable for drawing, thereby permitting an increased drawing rate and resulting in the production of a flatter, smoother, and more uniform thickness of sheet.

Other objects and advantages of the invention will become more apparent during the following description when taken in connection with the accompanying drawing.

In the drawing wherein like numerals are employed to designate like parts throughout the same, Fig. 1 is a vertical longitudinal section through sheet glass apparatus embodying the present invention, Fig. 2 is a vertical section taken substantially on line 2—2 of Fig. 1, and Fig. 3 is a side elevation of the apparatus, partially in section.

Referring particularly to Fig. 1, there is disclosed the forward or working end 5 of a continuous glass melting furnace of any suitable construction, containing a mass of molten glass 6. Extending transversely within the furnace and depending downwardly from the roof 7 thereof are the spaced vertical walls 8 and 9 which define therebetween a drawing chamber 10, said chamber being closed at each end by an end wall 11. That portion of the furnace disposed beneath the drawing chamber 10 is ordinarily termed the drawing or working area or zone, and drawn upwardly from the surface of the glass within said area or zone, at a point intermediate the vertical walls 8 and 9, is the glass sheet 12 connected with the mass of glass 6 by the meniscus 13. The glass sheet, as it leaves the drawing chamber 10, passes upwardly through a vertical annealing leer 14 of the desired height, being carried therethrough between a plurality of pairs of rolls 15 and 16 engaging opposite surfaces of the sheet and which rolls also provide the necessary traction for drawing the sheet upwardly from the molten bath.

To assist in maintaining the sheet to width, a pair of knurled rollers 17 may be positioned to engage opposite sides of the sheet at each edge thereof, these rollers being ordinarily arranged closely adjacent the meniscus 13. Disposed above the knurled rollers 17 at opposite sides of the sheet 12 are coolers 18 and 19 respectively, each comprising a substantially rectangular metal casing extending transversely of the sheet and being internally cooled by the circulation of a suitable cooling medium such as water therethrough.

Located above the coolers, approximately midway the upper and lower ends of the drawing chamber 10, are two relatively large rolls 20 and 21 adapted to engage opposite surfaces of the glass sheet and to have a wiping or smoothing action thereon. In other words, these rolls are not adapted to squeeze the sheet or to effect any actual reduction in the thickness thereof, but are so positioned that they simply contact with opposite surfaces of the said sheet to flatten or iron out the surfaces thereof whereby to minimize the formation of surface irregularities in the glass sheet and thus aid in the production of a flatter and smoother sheet which will be of a more uniform thickness. The rolls 20 and 21 also serve to anchor the base of the sheet and keep it from wavering or moving over the surface of the bath.

The side walls 8 and 9 of the drawing chamber terminate above the mass of molten glass 6 and have removably secured to the undersides thereof the two slabs 22 and 23 respectively carried by the rods 24 and 25. These slabs are preferably of a one-piece construction and have the lower surfaces thereof spaced slightly above the surface of the bath of molten glass. The slabs are made of one piece so that the under surfaces thereof adjacent the molten glass will be unbroken and free from all joints, thereby tending to eliminate what is known in the art as "cold streaks" in the glass passing therebeneath and which are very apt to be caused were the slabs formed of a plurality of blocks arranged side by side. In other words, the joints or cracks between adjacent blocks would have a tendency to cause "cold streaks" in the glass which would result in the formation of a sheet having thick and thin portions.

Arranged inwardly of the slabs 22 and 23 and suitably carried thereby, if desired, are the horizontal metallic channel members 26 and 27 respectively positioned relatively close to the surface of the mass of molten glass 6 and adapted to reflect heat downwardly thereupon so as to level out the temperature of the surface glass. Also, if preferred, there may be disposed at opposite sides of the drawing chamber 10 burners 28 and 29.

One of the leer rolls of each pair, and as here shown the roll 15, is mounted in a relatively fixed position while the roll 16 is movable toward and away from roll 15. The means for mounting and driving these rolls is illustrated in Fig. 3 in which 30 designates a driven vertical countershaft provided with a bevel pinion 31 for each roll 15 meshing with a bevel gear 32 carried at the corresponding end of the shaft 33 of the respective roll. The shaft 33 is provided at its opposite end with a spur gear 34 which meshes with a similar gear 35 keyed to the shaft 36 of roll 16 so that the positive rotation of roll 15 will effect the rotation of roll 16. The shaft 36 of each roll 16 is carried at each end by a bell crank lever 37 pivotally mounted as at 38 and carrying at its outer end a weight 39 for urging the roll 16 toward roll 15. In this manner, the rolls 16 are pressed yieldably toward rolls 15 so that breakage of the glass sheet is avoided in case the sheet is not perfectly flat and true.

The wiping roll 20 is also preferably mounted in a relatively fixed position while the opposite roll 21 is yieldably urged toward roll 20. As shown in Fig. 3, the shaft 40 of roll 20 is rotatably mounted at each end within a bracket 41 secured in a fixed position by bolts or the like 42. This bracket is provided with a horizontal guide-way 43 within which is slidably mounted a bearing block 44 within which the shaft 45 of roll 21 is rotatably supported. The bearing block 44 is yieldably urged inwardly by means of a compression spring 46, with the inward movement thereof being limited by a nut 47 threaded upon bolt 48 secured to the said bearing block 44 and passing outwardly through the end portion 49 of the bracket 41. Thus, it will be readily apparent that the roll 21 is yieldably urged toward roll 20.

The roll 20 is positively driven such as by means of a sprocket chain 50 trained about a sprocket 51 keyed to the roll shaft 40. Carried at the opposite end of roll 20 is a gear 52 meshing with and driving a gear 53 carried by roll 21. The rolls 20 and 21 are preferably driven in the same direction as the movement of the glass sheet but at a relatively slower speed.

As set forth in the above statement of objects, it is an aim of this invention to afford a better and more accurate control of the temperature of the molten glass passing into the sheet being formed by conditioning the glass as it enters the drawing or working area or zone to the end that the glass drawn into the sheet will not only be of an improved quality, but of a temperature suitable for drawing. To this end, there is submerged within the mass of molten glass 6, preferably beneath the vertical walls 8 and 9 of the drawing chamber 10, the cooling devices or members 54 and 55 respectively which are adapted to cool and condition the molten glass flowing into the drawing area or zone. Each cooling device comprises a pair of superimposed pipes 56 and 57 extending transversely of the furnace and being arranged in contact with one another and preferably secured together at one or a plurality of points by welding or in some other suitable manner. The two pipes 56 and 57 are formed with the vertically offset end portions 58 and 59 respectively which project through openings in the side walls of the furnace and also through slots 60 formed in the removable slab member 22 or 23.

The pipes 56 and 57 of each cooling device are preferably in communication with one another at one end thereof so that a suitable cooling medium can be continuously circulated therethrough. For instance, the two pipes may be constructed of a single length of pipe bent upon itself as at 61, or two separate pipes may be used and suitably coupled together at one end. However, the pipes are in communication with one another to permit of the temperature control medium, such as water or the like, to be circulated therethrough. This cooling medium is preferably, although not necessarily, introduced into the lower pipe 56 from one end and after circulating through the pipes is discharged from the upper pipe 57 at the same side of the furnace.

As stated above, the greater portion of the glass which is drawn upwardly into the sheet 12 is taken from the surface of the mass of molten glass 6, and the greater portion of the flow of glass through the furnace is a so-called surface flow, the lower strata of glass in the tank having relatively slight movement. In other words, the glass sheet 12 is drawn mainly from the relatively thin surface layer or uppermost strata of glass in the working or drawing zone. The cooling devices 54 and 55, while submerged in the mass of molten glass 6, are preferably positioned relatively close to the surface thereof. That is to say, the cooling devices are disposed beneath the surface layer or uppermost strata of glass from which the sheet is drawn. The cooling devices will therefore serve to both condition and cool this layer or upper strata of glass as it flows thereover into the drawing zone. Thus, the cooling devices will function to reduce the temperature of the surface layer of glass so as to render it suitable for the drawing operation and, in addition, will tend to eliminate or reduce to a minimum the formation of lines and other defects in the glass. Consequently, the use of the water cooled devices 54 and 55 will not only give better control of the temperature of the molten glass passing into the drawing zone but, in addition, will result in the glass being of a better quality. In the manufacture of sheet glass, the molten glass flowing into the working zone is oftentimes too hot for the forming machines to handle and this is sometimes true even when the machine is being run at a relatively low speed. By employing the cooling devices 54 and 55, however, the temperature of the surface layer of glass will be reduced to a point suitable for drawing, thereby permitting an increased drawing rate and resulting in the production of a flatter, smoother, and more uniform thickness of sheet. This cooling and conditioning of the molten glass is accomplished without in any way obstructing or disturbing the flow of the surface layer or uppermost strata of glass passing into the drawing zone.

The means for supporting the cooling devices at opposite sides of the furnace may take a variety of different forms but, as here shown, each end of each cooling device is carried by or clamped between a pair of clamping members 62 and 63 respectively formed with the pairs of complemental flanges 64 and 65 through which pass screws 66 and 67, said screws being supported upon a block 68 carried by the fixed horizontal support 69. The screws 66 and 67 not only serve to secure the clamping members 62 and 63 together, but likewise serve to effect upon rotation thereof the vertical adjustment of the cooling devices within the mass of molten glass. The lower clamping member 62 is received for vertical slidable movement within the groove or guideway 70 formed in the block 68.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for making sheet glass, a furnace containing a mass of molten glass and being provided with a working end confining a relatively deep body of molten glass free and unobstructed throughout its depth and constituting a drawing area, means for drawing a sheet upwardly from the surface of the glass in said drawing area, and a temperature control device submerged in the mass of molten glass to one side of the drawing area and extending transversely of the furnace for regulating the temperature of the surface glass flowing thereover.

2. In apparatus for making sheet glass, a furnace containing a mass of molten glass and including a working end confining a relatively deep body of molten glass free and unobstructed throughout its depth and constituting a drawing area, means for drawing a sheet upwardly from the surface layer of glass in said drawing area, and a cooling device submerged in the mass of molten glass to one side of the drawing area and extending transversely of said furnace for cooling the surface layer of glass flowing thereover to the point of sheet formation.

3. In apparatus for making sheet glass, a furnace containing a mass of molten glass and including a working end confining a relatively deep body of molten glass free and unobstructed throughout its depth and constituting a drawing area, means for drawing a sheet upwardly from the uppermost strata of glass in said drawing area, a cooling device submerged in the mass of molten glass beneath the uppermost strata thereof at one side of the drawing area and extending transversely of said furnace for cooling the upper strata of glass flowing thereover to the point of sheet formation, and means for internally cooling said cooling device.

4. In apparatus for making sheet glass, a furnace containing a mass of molten glass and being provided with a working end confining a relatively deep body of molten glass free and unobstructed throughout its depth and constituting a drawing area, means for drawing a sheet upwardly from the surface of the glass in said drawing area, and a temperature control device submerged in the mass of molten glass at each side of the drawing area and extending transversely of the furnace for regulating the temperature of the surface glass flowing thereover.

5. In apparatus for making sheet glass, a furnace containing a mass of molten glass and including a working end confining a relatively deep body of molten glass free and unobstructed throughout its depth and constituting a drawing area, means for drawing a sheet upwardly from the surface layer of glass in said drawing area, and cooling devices submerged in the mass of molten glass at opposite sides of the drawing area and extending transversely of said furnace for cooling the surface layer of glass flowing thereover to the point of sheet formation.

6. In apparatus for making sheet glass, a furnace containing a mass of molten glass and including a working end confining a relatively deep body of molten glass free and unobstructed throughout its depth and constituting a drawing area, means for drawing a sheet upwardly from the uppermost strata of glass in said drawing area, cooling devices submerged in the mass of molten glass beneath the uppermost strata thereof at opposite sides of the drawing area and extending transversely of said furnace for cooling the upper strata of glass flowing thereover to the point of sheet formation, and means for internally cooling said cooling device.

7. In apparatus for making sheet glass, a furnace containing a mass of molten glass and including a working end confining a relatively deep body of molten glass free and unobstructed throughout its depth and constituting a drawing area, means forming a substantially closed drawing chamber arranged above said drawing area, means for drawing a sheet upwardly through said drawing chamber from the surface layer of glass in the drawing area, and temperature control means submerged in the mass of molten glass at one side of the drawing area for regulating the temperature of the surface layer of glass flowing thereinto.

8. In apparatus for making sheet glass a furnace containing a mass of molten glass and including a working end confining a relatively deep body of molten glass free and unobstructed throughout its depth and constituting a drawing area, means forming a substantially closed drawing chamber arranged above said drawing area, means for drawing a sheet upwardly through said drawing chamber from the uppermost strata of glass in the drawing area, and temperature control means submerged in the mass of molten glass beneath the uppermost strata thereof at opposite sides of the drawing area for regulating the temperature of the upper strata of glass flowing into said area.

9. In apparatus for making sheet glass, a furnace containing a mass of molten glass and including a working end confining a relatively deep body of molten glass free and unobstructed throughout its depth and constituting a drawing area, means forming a substantially closed drawing chamber, disposed above said drawing area, means for drawing a sheet upwardly through said drawing chamber from the surface layer of glass in the drawing area, and a cooling device submerged in the mass of molten glass and extending transversely of the furnace to one side of the drawing area for cooling the surface layer of glass flowing thereinto.

10. In apparatus for making sheet glass, a furnace containing a mass of molten glass and including a working end confining a relatively deep body of molten glass free and unobstructed throughout its depth and constituting a drawing area, means forming a substantially closed drawing chamber, disposed above said drawing area, means for drawing a sheet upwardly through said drawing chamber from the uppermost strata of glass in the drawing area, and cooling devices submerged in the mass of molten glass beneath the uppermost strata thereof at opposite sides of the drawing area and extending transversely of the furnace for cooling the upper strata of glass flowing into said area.

JOHN L. DRAKE.